US010789843B2

United States Patent
Berry et al.

(10) Patent No.: US 10,789,843 B2
(45) Date of Patent: Sep. 29, 2020

(54) METHOD FOR AUTOMATICALLY LOCATING AND COMMISSIONING LIGHTING SYSTEM COMPONENTS

(71) Applicant: Universal Lighting Technologies, Inc., Madison, AL (US)

(72) Inventors: Travis L. Berry, Madison, AL (US); John Cavacuiti, Burnaby (CA); Rob Mahaffey, Burnaby (CA)

(73) Assignee: Universal Lighting Technologies, Inc., Madison, AL (US)

( * ) Notice: Subject to any disclaimer, the term of this patent is extended or adjusted under 35 U.S.C. 154(b) by 266 days.

(21) Appl. No.: 15/981,147

(22) Filed: May 16, 2018

(65) Prior Publication Data

US 2020/0279482 A1    Sep. 3, 2020

Related U.S. Application Data

(60) Provisional application No. 62/506,655, filed on May 16, 2017.

(51) Int. Cl.
*B60Q 1/48* (2006.01)
*G08G 1/14* (2006.01)
*H05B 47/115* (2020.01)

(52) U.S. Cl.
CPC ............ *G08G 1/142* (2013.01); *H05B 47/115* (2020.01)

(58) Field of Classification Search
CPC ........ G08G 1/147; G08G 1/144; G08G 1/143; G08G 1/146; G08G 1/14; G08G 1/148;
(Continued)

(56) References Cited

U.S. PATENT DOCUMENTS 8,159,156 B2    4/2012  Henig et al.
9,192,028 B2   11/2015  Walma et al.
(Continued)

FOREIGN PATENT DOCUMENTS

JP    2003168196 A    6/2003
JP    2013535007 A    9/2013
(Continued)

OTHER PUBLICATIONS

Office Action for corresponding Japanese Patent Application No. 2018-114385, dated Jul. 3, 2020, 8 pages.

*Primary Examiner* — Anh V La
(74) *Attorney, Agent, or Firm* — Patterson Intellectual Property Law, P.C.; Gary L. Montle (57) ABSTRACT

A control system for a vehicle parking area includes occupancy sensing devices, which may be associated with light fixtures. During a device commissioning mode, each device emits position signals and identifies signal characteristics of position signals received from proximate devices thereto. A central controller collects the position signals from the devices and generates a data set comprising identified locations for each device relative to predetermined baseline locations, based on the received position signals and the identified signal characteristics. The controller further maps the identified locations for each of the devices to specified locations in the parking area comprising the predetermined baseline locations. During a normal operating mode, the controller may generate signals directing drivers in the parking area to unoccupied parking spaces, and/or regulate a lighting state for light fixtures in the parking area based at least partly on detected occupancy states.

20 Claims, 5 Drawing Sheets

(58) Field of Classification Search
CPC ........ G08G 1/142; G08G 1/149; G08G 1/141; G08G 1/145; G01C 21/3685; G07F 17/246; G01S 2013/9314; G01S 5/0289; B60Q 9/002; B60R 2300/806; H04W 84/18; H04L 61/2038; G07B 15/02
USPC ..... 340/932.2, 933, 937, 908, 988, 989, 990
See application file for complete search history.

(56) References Cited

U.S. PATENT DOCUMENTS

| | | | |
|---|---|---|---|
| 9,521,724 B1 | 12/2016 | Berry et al. | |
| 9,629,227 B2 | 4/2017 | Bello et al. | |
| 9,747,196 B2 | 8/2017 | Simonyi et al. | |
| 2008/0218087 A1 | 9/2008 | Crouse et al. | |
| 2010/0265100 A1 | 10/2010 | Jalbout et al. | |
| 2011/0099126 A1* | 4/2011 | Belani | G08G 1/14 705/418 |
| 2011/0102197 A1* | 5/2011 | Herwich | E01F 9/559 340/932.2 |
| 2011/0199004 A1 | 8/2011 | Henig et al. | |
| 2014/0218527 A1* | 8/2014 | Subramanya | G01S 13/50 348/148 |
| 2014/0328211 A1 | 11/2014 | Holleis et al. | |
| 2014/0335897 A1* | 11/2014 | Clem | G08G 1/147 455/456.3 |
| 2015/0130641 A1* | 5/2015 | Rahman | G08G 1/144 340/932.2 |
| 2015/0327348 A1 | 11/2015 | Dau | |
| 2016/0133125 A1* | 5/2016 | Sandbrook | G08G 1/147 340/933 |

FOREIGN PATENT DOCUMENTS

| | | |
|---|---|---|
| JP | 2016531411 A | 10/2016 |
| WO | 2008081780 A1 | 7/2008 |
| WO | 2017045885 A1 | 3/2017 |

* cited by examiner

METHOD FOR AUTOMATICALLY LOCATING AND COMMISSIONING LIGHTING SYSTEM COMPONENTS

CROSS-REFERENCES TO RELATED APPLICATIONS

This application claims benefit of U.S. Provisional Patent Application No. 62/506,655, filed May 16, 2017, and which is hereby incorporated by reference.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND

The present invention relates generally to occupancy detection and control systems for parking spaces in a parking area. More particularly, the present invention relates to systems and methods for automatically mapping occupancy sensors for each defined parking space throughout a parking area such as a parking garage.

Smart parking garages that can detect open parking spaces, communicate the number of open spaces to users, and guide the driver to an open space have become common, but they typically require a time consuming manual process to determine the total number and physical location of spaces in a large parking garage.

Today, the activity of commissioning wireless devices may be accomplished via several methods. One method requires an individual to walk throughout the facility and assign and/or record unique addresses for each device. This information is then stored locally in the devices and entered, either real-time or thereafter, into the controller. The unique addresses are stored in the devices via dip switch or in memory location (via infrared or radio). The disadvantage of this arrangement is the time and cost associated with the walk-through and assigning of devices. There is also a potential for error if the addresses are improperly set or recorded.

Methods for automatically determining the physical location of wireless devices in a lighting control system based on wireless signal strength and triangulation also exist. However, they are inherently inaccurate because received signal strength can be impacted by obstructions and other wireless signals, and further because the location of sensors, switches, fixtures and controllers have no predetermined relation to each other.

BRIEF SUMMARY

Systems and methods as disclosed herein may address the aforementioned problems by using signal strength and directionality data to determine the relative locations of parking sensors in a parking garage application.

Accordingly, embodiments of a system and method as disclosed herein may reduce the time, cost and possibility of error during commissioning.

In a particular embodiment, an exemplary and automatic method is provided for determining locations of a plurality of wireless sensors, each of which determines the signal strength of all other wireless devices within range, determines if the incoming signal is "in-line" with the sensor indicating it is from an adjacent parking spot, and further sends this data to a main gateway or controller. An installer or otherwise authorized administrator identifies the physical locations of one or more system devices or light fixtures and uses the identified physical location as a datum point. A mathematical algorithm may be implemented by, e.g., a controller to determine the relative location of each device based on signal strength measurements and the direction of signals from adjacent devices. Using the position algorithm, the relative device map may be overlaid on top of a known floor plan and the associated locations of one or more system devices or light fixtures. The relative device map may then be scaled to match the actual floor plan.

For embodiments involving parking space installations, determining position is made significantly more accurate because >90% of spacing is approximately 8.5 feet apart (i.e., the average space in a North American parking garage), and >90% of system devices are in axis with other. A majority of system devices are further installed at the same height (z) and only vary in position with respect to the ceiling itself (x, y).

In a particular embodiment, a control system for a vehicle parking area may include a plurality of occupancy sensing devices each having a unique identifier. Each device may be configured to emit and receive position signals at least during a device commissioning mode, to identify signal characteristics of the received position signals from one or more proximate occupancy sensing devices, and to transmit the received position signals and identified signal characteristics to a central controller. The central controller may further be configured to generate a data set comprising identified locations for each of the plurality of occupancy sensing devices relative to one or more predetermined baseline locations, based on the received position signals and the identified signal characteristics. The controller may further map the identified locations for each of the plurality of occupancy sensing devices to specified locations in the parking area comprising the one or more predetermined baseline locations, wherein during the commissioning mode each unique identifier is associated with a specified location in the parking area.

In one exemplary aspect of the aforementioned embodiment, the signal characteristics may comprise a strength and directionality of the received position signals, and the plurality of occupancy sensing devices are configured to transmit received position signals for any one or more of the received position signals having a minimum signal strength.

In another exemplary aspect of the aforementioned embodiment, the signal characteristics may comprise a strength and directionality of the received position signals, and the plurality of occupancy sensing devices are configured to transmit received position signals for any one or more of the received position signals as determined from adjacent sensing devices.

In another exemplary aspect of the aforementioned embodiment, the signal characteristics may comprise a strength and directionality of the received position signals, and the controller is further configured to determine relative locations for each of the plurality of sensing devices based on the corresponding strength and directionality of the received position signals.

In another exemplary aspect of the aforementioned embodiment, each of the plurality of occupancy sensing devices may be further configured during a normal operating mode to generate occupancy detection signals corresponding to a detected occupancy of the respective specified location in the parking area. The controller may further be configured to generate signals directing vehicles to unoccupied locations in the parking area. For example, the controller may be linked to one or more visual indicators configured to display a number of unoccupied locations in the parking area or a direction to one or more respective unoccupied locations in the parking area. Additionally, or in the alternative, the controller may be linked to a server-based platform configured to selectively display a number of unoccupied locations in the parking area or a direction to one or more respective unoccupied locations in the parking area on a user interface accessible to drivers in the parking area.

In another exemplary aspect of the aforementioned embodiment, an administrator interface may be provided and configured to enable user selection of the one or more baseline locations relative to a floor plan for the parking area, wherein the unique identifier for a corresponding sensing device is assigned to the baseline location.

In another embodiment of a control system for a vehicle parking area as disclosed herein, a plurality of light fixtures may be provided each comprising a lighting device and an occupancy sensor. During a device commissioning mode, the light fixtures may be configured to emit and receive position signals, identify signal characteristics of the received position signals from one or more proximate light fixtures, and transmit the received position signals and identified signal characteristics to a central controller. During a normal operating mode, the light fixtures may further be configured to generate occupancy detection signals corresponding to a detected occupancy of the respective specified location in the parking area. The central controller in such an embodiment is configured to generate a data set comprising identified locations for each of the plurality of the light fixtures relative to one or more predetermined baseline locations, based on the received position signals and the identified signal characteristics, and map the identified locations for each of the plurality of light fixtures to specified locations in the parking area comprising the one or more predetermined baseline locations.

In one aspect of the aforementioned embodiment, the central controller may be further configured to generate control signals to one or more of the plurality of light fixtures, for regulating a lighting output of respective lighting devices based on a detected occupancy state of the associated location in the parking area.

DETAILED DESCRIPTION

Referring generally to FIGS. 1-5, various exemplary embodiments of an invention may now be described in detail. Where the various figures may describe embodiments sharing various common elements and features with other embodiments, similar elements and features are given the same reference numerals and redundant description thereof may be omitted below.

Various embodiments of a system and method as disclosed herein may reduce or eliminate the manual walk-through and mapping associated with traditional parking control systems. Such systems may for example implement wireless sensors installed directly above parking spots in a pre-determined housing that can be characterized for its impact on wireless signal strength in all directions, and further using multiple or phased array antennas that are always in a known direction versus a parking spot to determine directionality of wireless signals.

Figure 1:
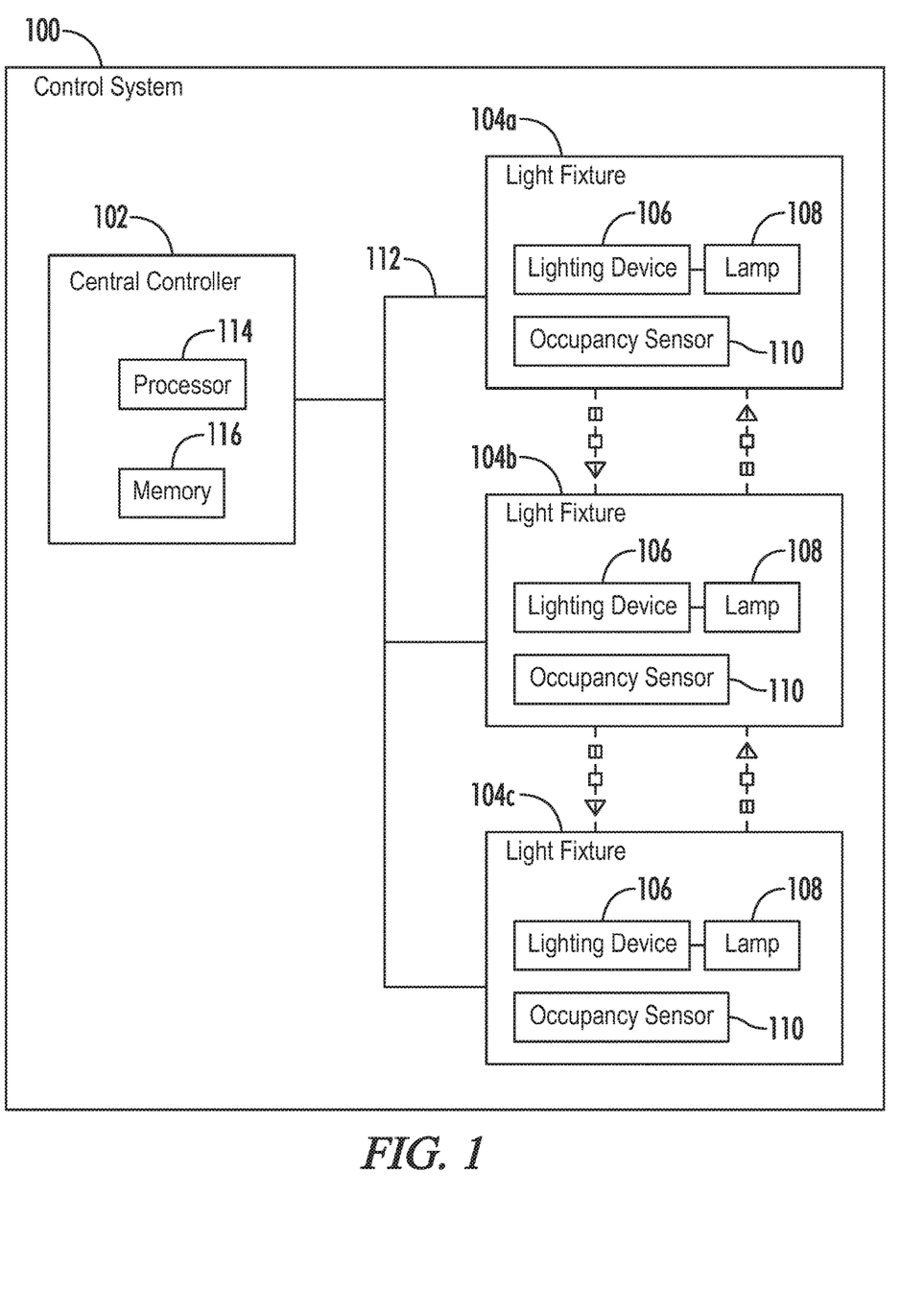
FIG. 1 is a block diagram representing an embodiment of an automated commissioning and control system as disclosed herein.

An embodiment as represented in FIG. 1 enables automated or automatic commissioning of system devices 110 and/or light fixtures 104 installed in a vehicle parking system 100 including a central system controller 102 and a communication link 112. The communication link 112 may include a gateway (not shown) for enabling communication between the system controller 102 and the light fixtures 104a, 104b, 104c and system devices 110 of the control system 100. The communication link 112 may be any combination of wired and wireless connections and protocols, including a power line communication network, or Ethernet network. The optional gateway (not shown) may provide a link between an on-site communication network and an off-site communication network and/or adapt one communication protocol to another communication protocol on-site or off-site.

System devices may include, but are not limited, to occupancy sensors, light sensors, and light switches. System devices such as occupancy sensing devices may be provided in a stand-alone context or integrated or otherwise associated with a light fixture. Light fixtures may typically include a light fixture controller and a lighting device 106 for driving a lamp 108. As used herein, the term "lighting device" 106 may include without limitation electronic ballasts, driver circuits and/or controllers of any form capable of modulating light output by a lamp, and the term "lamp" as used herein may include all light sources capable of being device thereby, such as fluorescent lamps, incandescent bulbs, high intensity discharge lamps, LED's, OLED's, and plasmoidals. Commissioning includes assigning system devices and light fixtures to a particular group, area, or zone, defining their interaction with other system devices or light fixtures, or defining their behavior.

In various embodiments, occupancy sensors as provided in a stand-alone device or otherwise integrated in a light fixture may be designed to implement any of a number of available technologies. For example, the sensors may comprise imaging sensors (e.g., cameras), distance measuring (e.g., ultrasonic) sensors, magnetometers or the like. In an embodiment, sensors may be provided to detect generally whether or a vehicle is positioned in the associated parking space, or may be configured to detect whether a specific vehicle or class of vehicles is positioned in the associated parking space.

The system controller 102 may be included in a controller of one or more system devices or light fixtures. Alternatively, the system controller 102 may reside onsite but separately from each of the system devices or light fixtures. The system controller 102 may still further be located off-site (i.e., at a facility other than the facility in which the light fixtures 104 and system devices 110 are installed). The system controller 102 may include a processor 114 and a memory 116, and examples of a system controller 102 may include a dedicated controller, a general-purpose computer, or a building management system.

Figure 5:
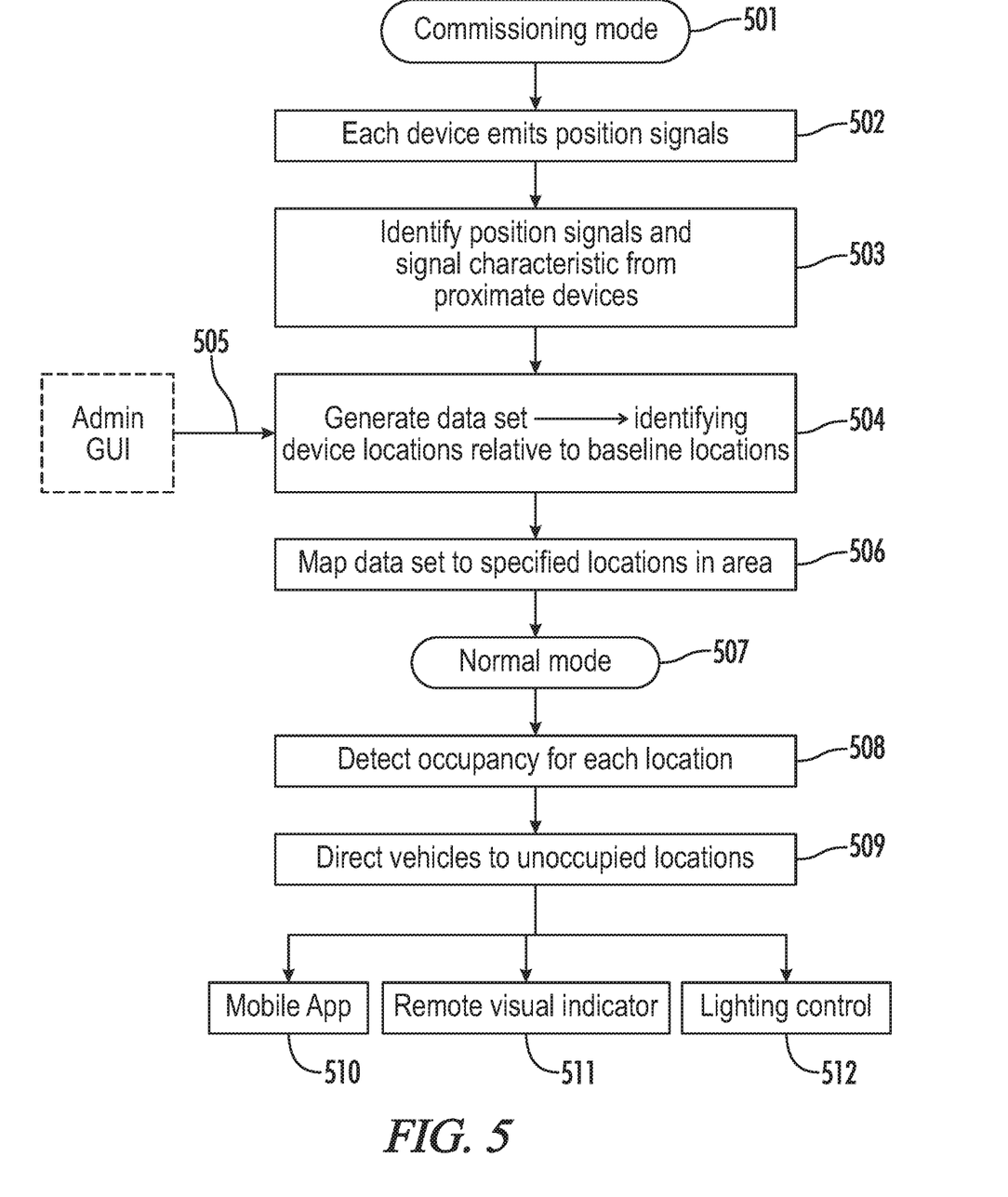
FIG. 5 is a flowchart representing an embodiment of an automated commissioning and control method as disclosed herein.

Referring to FIG. 5, an exemplary commissioning process may include installing wireless equipment (e.g., system devices) in an area to be monitored. Each installed component may be provided have unique addresses and the ability to determine and communicate the signal strength of adjacent devices. Such features are inherent to certain wireless protocols such as ZigBee and Bluetooth. In an embodiment the system devices may be equipped with radio frequency signal generators, transceivers, sensors or the like, and may further be configured to determine if the wireless signals received from one or more neighboring sensors are in-line or on axis.

Upon initiation of a commissioning mode (501), each light fixture controller or associated controller for a stand-alone system device may for example receive commissioning commands from the system controller, wherein a control signal is provided to cause the emission of position signals (502). The device controller may further be configured to report the address and signal strength of proximate devices with which it can communicate (503) and whether they are in-line or on axis. This information could be reported to the central controller or a configuration "tool", which could be for example any variety of computers with adequate storage and processing power.

In an embodiment, an "RF Map" algorithm may be implemented by the system controller to evaluate the information from the plurality of light fixtures or system devices and generate a graphical representation of the physical location of each system device based on the information received. For devices that are not "inline," triangulation may be used by the system to determine relative location. Exemplary procedures for triangulation are well documented in the prior art and have been used, for example, to locate mobile phone users that have called 911. Embodiments of a system and method as disclosed herein may employ triangulation to generate a "relative" location map of all devices with respect to one or more baseline positions (datum points) and present them in a graphical form.

Figure 2:
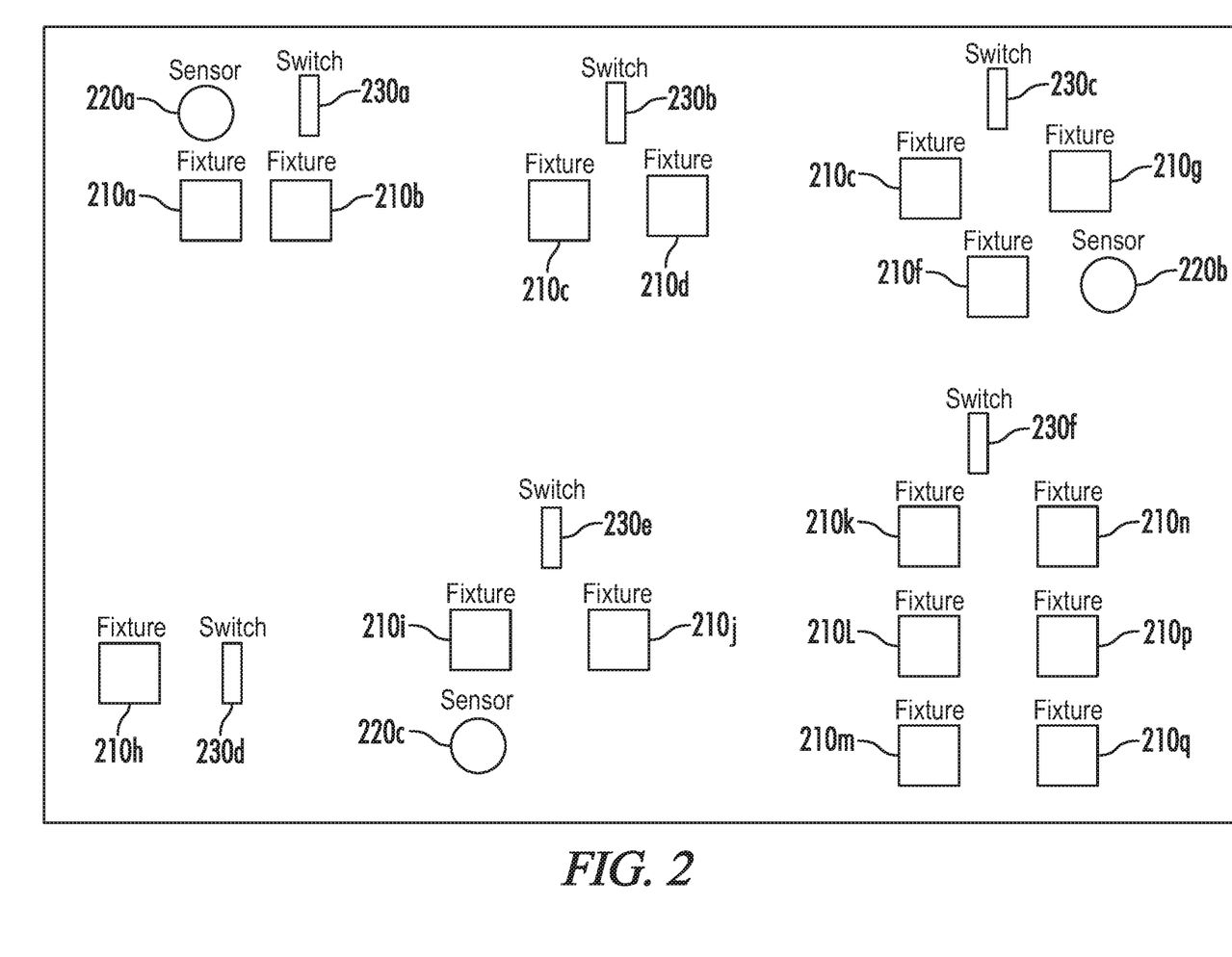
FIG. 2 is a diagram representing an exemplary RF map with locations determined using relative signal strength and triangulation.

Referring to FIG. 2, an exemplary RF map as represented therein is generated from the determined signal strength from device to device. A first sensor 220a is able to communicate with proximate switch 230a, fixture 210a, fixture 210b and fixture 210c. The fixture 210c is further able to communicate with switch 230b, fixture 210d, fixture 210b, switch 230a and switch 230e. The remainder of the represented RF map is similarly developed as may be appreciated by one of skill in the art.

An individual responsible for commissioning may, via for example a hosted graphical user interface (505) refer to the device map generated by the process and physically locate one or more of the installed system devices installed. This could be done relatively easily by considering devices on the "edge" of the generated map, such as sensor 220a in the example shown in FIG. 2.

This process could also be supplemented with a handheld device that is configured to receive the emitted position signals and further indicate the signal strength and addresses of nearby system devices. The authorized individual may then use the locations of the one or more system devices as the one or more baseline positions (datum points).

Figure 3:
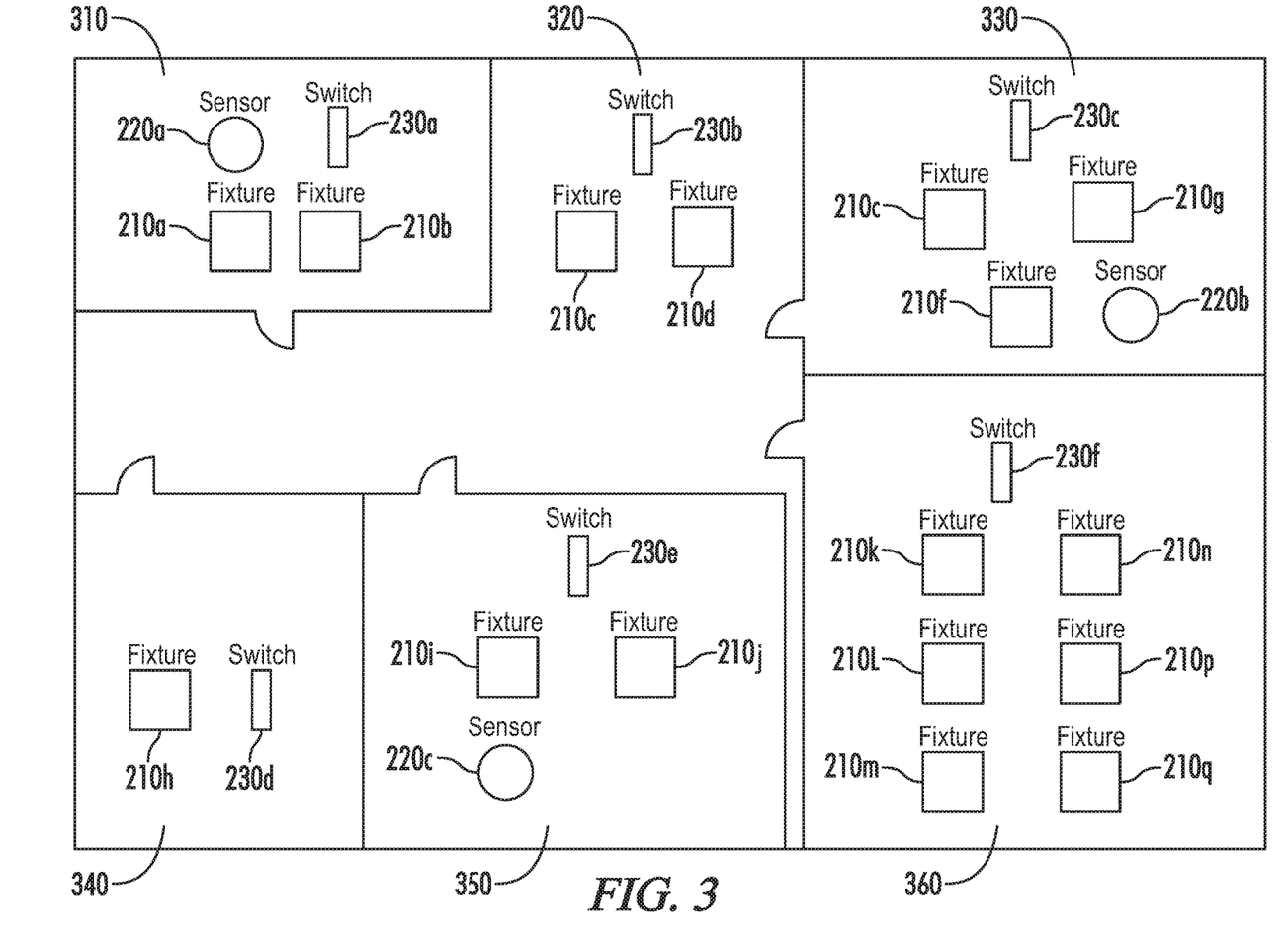
FIG. 3 is a diagram representing the exemplary RF map of FIG. 2 as further scaled to a floor plan.

Referring next to FIG. 3, the RF map is then overlaid on a facility floorplan (506) with the one or more baseline positions anchored to their known locations. The RF map is then scaled such that it aligns with the floor plan where the equipment is installed. In an embodiment, the floor plan may be manually provided via for example the hosted user interface, or may be imported or otherwise obtained from one or more drawings in an appropriate computer readable format.

With this map, the user can from a single appropriately configured computing device assign sensors to fixtures, switches to fixtures, fixture groups (e.g., based on proximity to windows), etc. In the exemplary representation in FIG. 3, the system devices in the northwest corner office (310) will be "grouped": switch 230a and sensor 220a may be configured to control fixtures 210a and 210b. In a different group (350), switch 230e and sensor 220c may be configured to control fixtures 210i and 210j. Groups (320), (330), (340) and (360) may be similarly configured.

The commissioning process is accordingly simplified. Addresses are automatically collected, the locations of the various system devices are automatically determined, and grouping and behavior of system devices can be set from a single location, perhaps even remote from the physical installation.

In an embodiment, the controller may be appropriately programmed or configured to "read" the floorplan information and group and configure the system devices automatically. For example, the controller may be configured to identify walls and windows in the floor plan in order to accurately commission the system devices.

Figure 4:
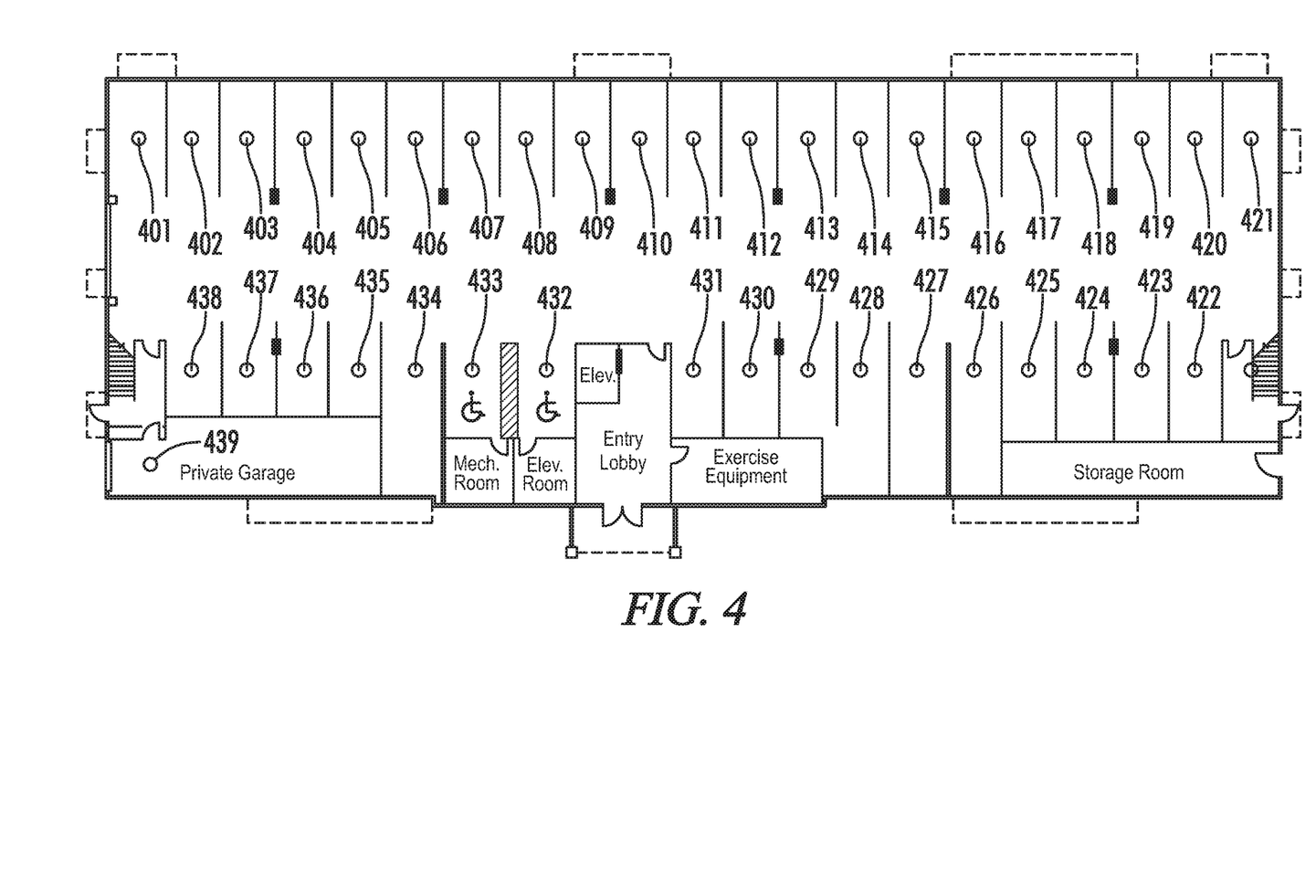
FIG. 4 is a diagram representing another exemplary RF map as further scaled to a floor plan for a parking area.

Referring next to an exemplary configuration as represented in FIG. 4, thirty eight sensors (401)-(438) are installed directly above and centered in respective parking stalls. If a first sensor 401 position is known the position of a second sensor 402 can be accurately estimated as being in the neighboring stall, based on the determined signal strength and further in that it is determined to be in-line with the first sensor 401 using its multi-phased antenna. The position of a third sensor 403 as a neighboring stall can also be accurately determined using the same technique, etc.

The various sensors may be automatically and accurately grouped using a simple algorithm. A first group may include sensors 401-421 as inline neighboring stalls. A second group may include sensors 422-428 as inline neighboring stalls. A third group may include sensors 427-431 as inline neighboring stalls. A fourth group may include sensors 432-433 as inline neighboring stalls. And a fifth group may include sensors 434-438 as inline neighboring stalls. The positions of the five groups relative to each other can be roughly estimated using standard (but generally less accurate) triangulation techniques.

As with the previous example from FIGS. 2-3, an individual responsible for commissioning may refer to the device map generated by the process and physically locate one or more of the installed system devices. In the example represented in FIG. 4, this may for example be a system device at the edge or periphery of the map such as sensor 401.

The individual then uses the location of the single device as the datum point. The RF map is overlaid on the facility floorplan with the datum anchored to its known location. The RF map is then scaled such that it aligns with the floor plan where the equipment is installed.

Once the commissioning process is completed, which may be manually initiated or in certain embodiments may be automatically initiated on a periodic or event-based basis, the system may reenter a normal operating mode (507). In a particular example wherein the system devices comprise occupancy sensing devices or occupancy sensors integrated with a light fixture, each device may be configured to determine whether the associated parking space is occupied by a vehicle (508). The system may then generate notifications and/or control signals for directing drivers to unoccupied parking spaces (509).

In one example, the system may coordinate with a user interface on a driver's computing device via a mobile or web-based application (510), so as to provide directions or otherwise highlight unoccupied parking spaces on a visual display. The user interface may alternatively highlight a nearest unoccupied parking space based on a current location of the vehicle relative to a plurality of unoccupied parking spaces.

In another example, the system may generate control signals to visual indicators (511) so as to indicate to drivers in the parking area a direction to the nearest unoccupied space, a number of unoccupied spaces, etc.

In another example, the system may generate control signals to light fixtures associated with the occupancy sensing devices, wherein the lighting output of a given light fixture can be regulated based on the occupancy state of the parking space (512). For example, light fixtures may be configured to turn on, modulate, change color, increase lumen output relative to their occupied neighboring stalls, or the like so as to call attention to the occupancy state thereof.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "circuit" means at least either a single component or a multiplicity of components, either active and/or passive, that are coupled together to provide a desired function. Terms such as "wire," "wiring," "line," "signal," "conductor," and "bus" may be used to refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein.

Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art.

Although embodiments of the present invention have been described in detail, it will be understood by those skilled in the art that various modifications can be made therein without departing from the spirit and scope of the invention as set forth in the appended claims.

A controller, computing device, or computer, such as described herein, includes at least one or more processors or processing units and a system memory. The controller may also include at least some form of computer readable media. By way of example and not limitation, computer readable media may include computer storage media and communication media. Computer readable storage media may include volatile and nonvolatile, removable and non-removable media implemented in any method or technology that enables storage of information, such as computer readable instructions, data structures, program modules, or other data. Communication media may embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A control system for a vehicle parking area comprising:
a plurality of occupancy sensing devices configured to be installed in the vehicle parking area and sense a presence of a vehicle, each of the plurality of occupancy sensing devices having a unique identifier and further being configured to
emit and receive position signals at least during a device commissioning mode,
identify signal characteristics of the received position signals from one or more proximate occupancy sensing devices, and
transmit the received position signals and identified signal characteristics to a central controller;
wherein the controller is configured to
generate a data set comprising identified locations for each of the plurality of occupancy sensing devices relative to one or more predetermined baseline locations, based on the received position signals and the identified signal characteristics, and
map the identified locations for each of the plurality of occupancy sensing devices to specified locations in the parking area comprising the one or more predetermined baseline locations,
wherein during the commissioning mode each unique identifier is associated with a specified location in the parking area.

2. The control system of claim 1, wherein the signal characteristics comprise a strength and directionality of the received position signals, and the plurality of occupancy sensing devices are configured to transmit received position signals for any one or more of the received position signals having a minimum signal strength.

3. The control system of claim 1, wherein the signal characteristics comprise a strength and directionality of the received position signals, and the plurality of occupancy sensing devices are configured to transmit received position signals for any one or more of the received position signals as determined from adjacent sensing devices.

4. The control system of claim 1, wherein the signal characteristics comprise a strength and directionality of the received position signals, and the controller is further configured to determine relative locations for each of the plurality of sensing devices based on the corresponding strength and directionality of the received position signals.

5. The control system of claim 1, wherein each of the plurality of occupancy sensing devices is further configured during a normal operating mode to generate occupancy detection signals corresponding to a detected occupancy of the respective specified location in the parking area.

6. The control system of claim 5, wherein the controller is further configured to generate signals directing vehicles to unoccupied locations in the parking area.

7. The control system of claim 6, wherein the controller is linked to one or more visual indicators configured to display a number of unoccupied locations in the parking area or a direction to one or more respective unoccupied locations in the parking area.

8. The control system of claim 6, wherein the controller is linked to a server-based platform configured to selectively display a number of unoccupied locations in the parking area or a direction to one or more respective unoccupied locations in the parking area on a user interface accessible to drivers in the parking area.

9. The control system of claim 1, further comprising an administrator interface configured to enable user selection of the one or more baseline locations relative to a floor plan for the parking area, wherein the unique identifier for a corresponding sensing device is assigned to the baseline location.

10. A control system for a vehicle parking area comprising:
a plurality of light fixtures configured to be installed in the vehicle parking area and sense a presence of a vehicle, each of the light fixtures comprising a lighting device and an occupancy sensor, wherein each of the light fixtures are configured:
during a device commissioning mode, to emit and receive position signals, identify signal characteristics of the received position signals from one or more proximate light fixtures, and transmit the received position signals and identified signal characteristics to a central controller, and
during a normal operating mode, to generate occupancy detection signals corresponding to a detected occupancy of the respective specified location in the parking area;
wherein the central controller is configured to
generate a data set comprising identified locations for each of the plurality of the light fixtures relative to one or more predetermined baseline locations, based on the received position signals and the identified signal characteristics, and
map the identified locations for each of the plurality of light fixtures to specified locations in the parking area comprising the one or more predetermined baseline locations.

11. The control system of claim 10, wherein the signal characteristics comprise a strength and directionality of the received position signals, and the plurality of light fixtures are configured to transmit received position signals for any one or more of the received position signals having a minimum signal strength.

12. The control system of claim 10, wherein the signal characteristics comprise a strength and directionality of the received position signals, and the plurality of light fixtures are configured to transmit received position signals for any one or more of the received position signals as determined from adjacent light fixtures.

13. The control system of claim 10, wherein the signal characteristics comprise a strength and directionality of the received position signals, and the controller is further configured to determine relative locations for each of the plurality of light fixtures based on the corresponding strength and directionality of the received position signals.

14. The control system of claim 10, wherein the controller is further configured to generate signals directing vehicles to unoccupied locations in the parking area.

15. The control system of claim 14, wherein the controller is linked to one or more visual indicators configured to display a number of unoccupied locations in the parking area or a direction to one or more respective unoccupied locations in the parking area.

16. The control system of claim 15, wherein the controller is linked to a server-based platform configured to selectively display a number of unoccupied locations in the parking area or a direction to one or more respective unoccupied locations in the parking area on a user interface accessible to drivers in the parking area.

17. The control system of claim 10, further comprising an administrator interface configured to enable user selection of the one or more baseline locations relative to a floor plan for the parking area, wherein a unique identifier for a corresponding light fixture is assigned to the baseline location.

18. The control system of claim 10, wherein the central controller is further configured to generate control signals to one or more of the plurality of light fixtures, for regulating a lighting output of respective lighting devices based on a detected occupancy state of the associated location in the parking area.

19. A method of commissioning a plurality of light fixtures installed in specified locations of a vehicle parking area, the method comprising:

during a device commissioning mode, producing from each of the plurality of light fixtures one or more position signals, identifying signal characteristics for any of the one or more position signals as received by a proximate light fixture thereto, generating a data set comprising identified locations for each of the plurality of the light fixtures relative to one or more predetermined baseline locations, based on the received position signals and the identified signal characteristics, and mapping the identified locations for each of the plurality of light fixtures to specified locations in the parking area comprising the one or more predetermined baseline locations; and during a normal operating mode, detecting an occupancy state and a lighting state corresponding to each respective specified location in the parking area.

20. The method of claim 19, further comprising during the normal operating mode generating signals directing vehicles to unoccupied locations in the parking area.

* * * * *